(12) United States Patent
Leis

(10) Patent No.: US 11,808,451 B1
(45) Date of Patent: Nov. 7, 2023

(54) FLUE CAP WITH FILTER

(71) Applicant: William Mario Leis, Folsom, CA (US)

(72) Inventor: William Mario Leis, Folsom, CA (US)

( * ) Notice: Subject to any disclaimer, the term of this patent is extended or adjusted under 35 U.S.C. 154(b) by 309 days.

(21) Appl. No.: 17/399,914

(22) Filed: Aug. 11, 2021

Related U.S. Application Data

(60) Provisional application No. 63/159,910, filed on Mar. 11, 2021.

(51) Int. Cl.
| | | |
|---|---|---|
| *F23J 15/02* | (2006.01) | |
| *B01D 46/00* | (2022.01) | |
| *B01D 46/24* | (2006.01) | |

(52) U.S. Cl.
CPC .......... *F23J 15/02* (2013.01); *B01D 46/0017* (2013.01); *B01D 46/0031* (2013.01); *B01D 46/2418* (2013.01); *F23J 15/025* (2013.01); *B01D 2258/0283* (2013.01); *F23J 2213/50* (2013.01); *F23J 2215/10* (2013.01); *F23J 2215/101* (2013.01)

(58) Field of Classification Search
CPC .... F23J 2215/10; F23J 2215/101; F23J 15/02; F23J 15/025; F23J 2213/50; B01D 53/56; B01D 2258/0283; B01D 46/2418; B01D 46/0031; B01D 46/0017
See application file for complete search history.

(56) References Cited

U.S. PATENT DOCUMENTS

| | | | |
|---|---|---|---|
| 9,863,634 B1 * | 1/2018 | Arnold, Jr. ................ | F23G 7/07 |
| 2021/0129080 A1 * | 5/2021 | Song .................... | B01D 39/083 |

* cited by examiner

*Primary Examiner* — Robert Clemente
(74) *Attorney, Agent, or Firm* — Plager Schack LLP; Mark H. Plager; Kara K. Verryt

(57) ABSTRACT

A flue pipe filter device for reducing nitrogen oxide (NOx) emission levels from gas fired appliances may include a flue cap with a pipe connection adapter sized to attach to an existing exhaust pipe; a fanned flue cap body with vents operatively attached to a distal end of the pipe connection adapter; and a filter positioned within the fanned flue cap body, the filter designed to convert NOx emissions into reduced NOx emissions. The filter may have an interior honeycomb structure.

6 Claims, 3 Drawing Sheets

FLUE CAP WITH FILTER

RELATED APPLICATION

This application claims priority to provisional patent application U.S. Ser. No. 63/159,910 filed on Mar. 11, 2021, the entire contents of which is herein incorporated by reference.

BACKGROUND

The embodiments described herein relate generally to reducing nitrogen oxide (NOx) emissions and, more particularly, to a flue cap with a filter to reduce NOx emissions from gas appliances.

Air pollution is a major, global problem. In atmospheric chemistry, NOx is a generic term for the nitrogen oxides that are most relevant for air pollution, namely nitric oxide (NO) and nitrogen dioxide ($NO_2$). These gases contribute to the formation of smog and acid rain, as well as affecting tropospheric ozone.

Conventionally NOx flue gasses are allowed to escape from gas appliances through a flue pipe system at the rate of emission allowed by the gas fired appliance. Unfortunately, most gas-fired appliances in use today also do not meet current emission standards, as they were installed years ago.

Therefore, what is needed is a device to reduce emission levels from gas-fired appliances.

SUMMARY

Some embodiments of the present disclosure include a flue pipe filter device for reducing nitrogen oxide (NOx) emission levels from gas-fired appliances. The flue pipe filter device may include a flue cap with a pipe connection adapter sized to attach to an existing exhaust pipe; a fanned flue cap body with vents operatively attached to a distal end of the pipe connection adapter; and a filter positioned within the fanned flue cap body, the filter designed to convert NOx emissions into reduced NOx emissions. The filter may have an interior honeycomb structure.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
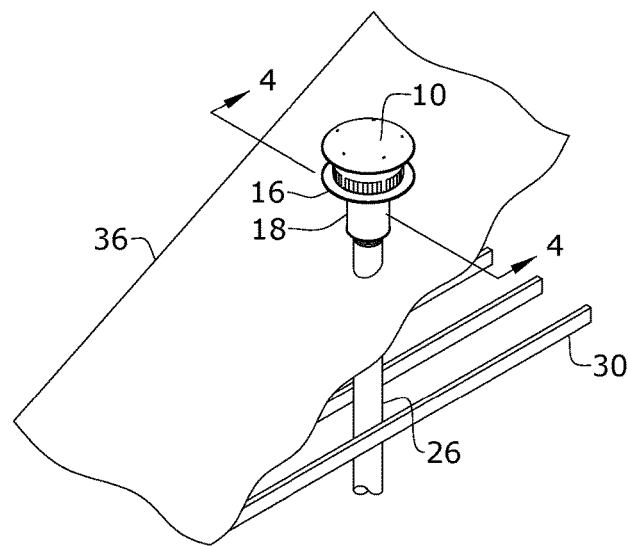
FIG. 1 is a perspective view of one embodiment of the present disclosure, shown in use.
Figure 2:
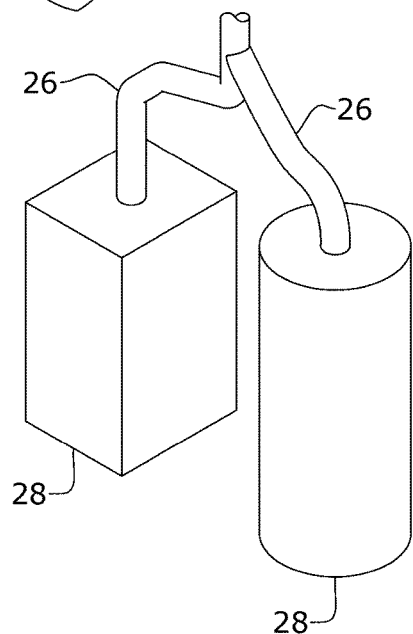
FIG. 2 is a perspective view of one embodiment of the present disclosure.
Figure 2:
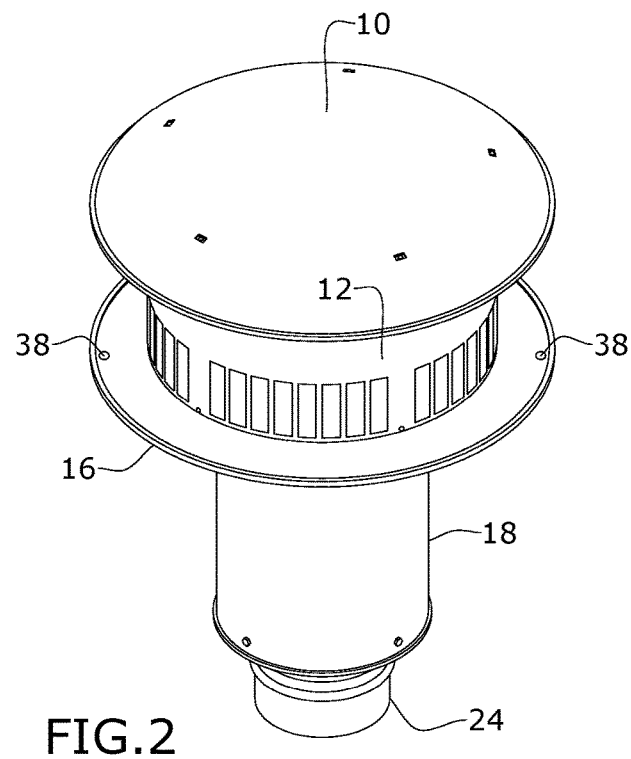
Figure 3:
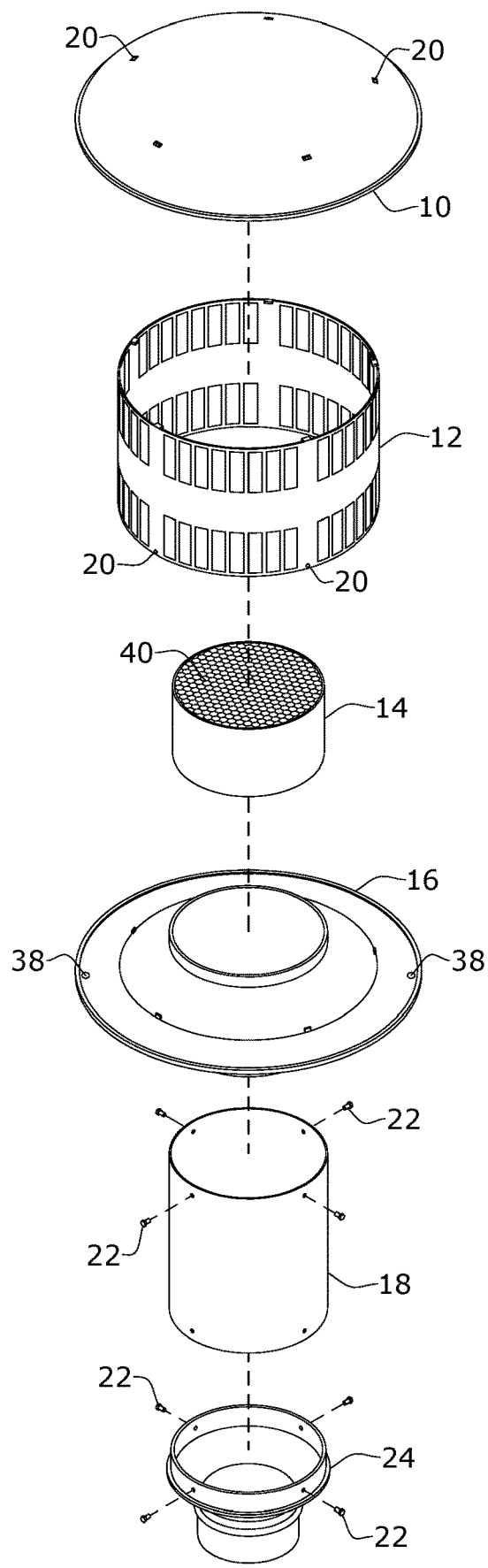
FIG. 3 is an exploded view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to reduce nitrogen oxide (NOx) emission levels from gas fired appliances and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements and the following examples are presented as illustrative examples only.

By way of example, and referring to FIGS. 1-4, some embodiments of the present disclosure include a flue pipe filter device for reducing NOx emission levels from gas fired appliances, the device comprising a flue cap with a pipe connection adapter 24 sized to attach to an existing exhaust pipe 26 that is operatively attached to at least one gas fired appliance 28, a fanned flue cap body with vents operatively attached to a distal end of the pipe connection adapter 24, and a filter 14 designed to convert NOx emissions 32 into reduced NOx emissions 34, wherein exhaust flows from the appliances 28 through the exhaust pipe 26, through the pipe connection adapter 24, into the fanned flue cap body through the filter 14, and out of the fanned flue cap body through the vents.

More specifically, the pipe connector adapter 24 may be attached to a lower flue 18, wherein a distal end of the lower flue 18 is attached to the fanned flue cap body. As shown in the Figures, the fanned flue cap body may comprise a lower cap 16 with a central tubular member sized to attached to the lower flue, wherein the filter 14 is sized to fit within the tubular member of the lower cap 16. A vent body 12 comprising a plurality of vents may be engaged with a top surface of the lower cap 16, and a top cap 10 may close off a top opening of the vent body 12, forcing airflow to go through the vents in the vent body 12. In a particular body, the vents on the vent body 12 may be louvered vents.

While the size and shape of components of the device of the present disclosure may vary, in some embodiments, the components may have the following general shapes. The pipe connector adapter 16 may have a flared portion extending from a tubular member portion, wherein the tubular member portion is designed to engage with the existing exhaust pipe 26. An end of the flared portion may operatively attached to a proximal end of the lower flue 18 using conventional fasteners such as screws 22. The lower flue 18 may have a substantially tubular shaped wherein a distal end of the lower flue 18 may attach to a bottom end of the central tubular member on the lower cap 16 using conventional fasteners, such as screws 22. In embodiments, the lower cap 16 may have an angled circular plate portion extending outward from the central tubular member, wherein the angled plate portion may comprise at least one condensate drip hole 38 extending therethrough. As shown in, for example, FIG. 3, the filter 14 may have a substantially cylindrical shape with a honeycomb interior structure 40 designed to filter NOx emissions. The vent body 12 may also be substantially cylindrical, where the vent body 12 may be attached to the lower cap 16 using a fastener, such as at least one rivet 20. As shown in the Figures, the vent body 12 may have a diameter larger than that of the central tubular member of the lower cap 16, which may help ensure that all exhaust flows out through the vents. The top cap 10 may have a rounded shape, such as a dome shape, wherein the top cap 10 may be attached to an end of the vent body 12 using conventional fasteners, such as rivets 20.

In embodiments, the flue cap may also include an inner liner (not shown), wherein the liner may be infused with, for example, urea or ammonia to improve the NOx reducing capabilities of the flue cap. Moreover, the shape of the flue cap may provide a vortex design to capture and filter the flue gases.

The flue pipe filtering device may be made of any suitable materials and, in some embodiments, comprises a metal, such as stainless steel. Moreover, the flue pipe filtering device may have any suitable or necessary size for attaching to conventional exhaust pipes 26 and, in some embodiments, may attach to exhaust pipes 26 have a size of from about 2 to about 12 inches.

Figure 4:
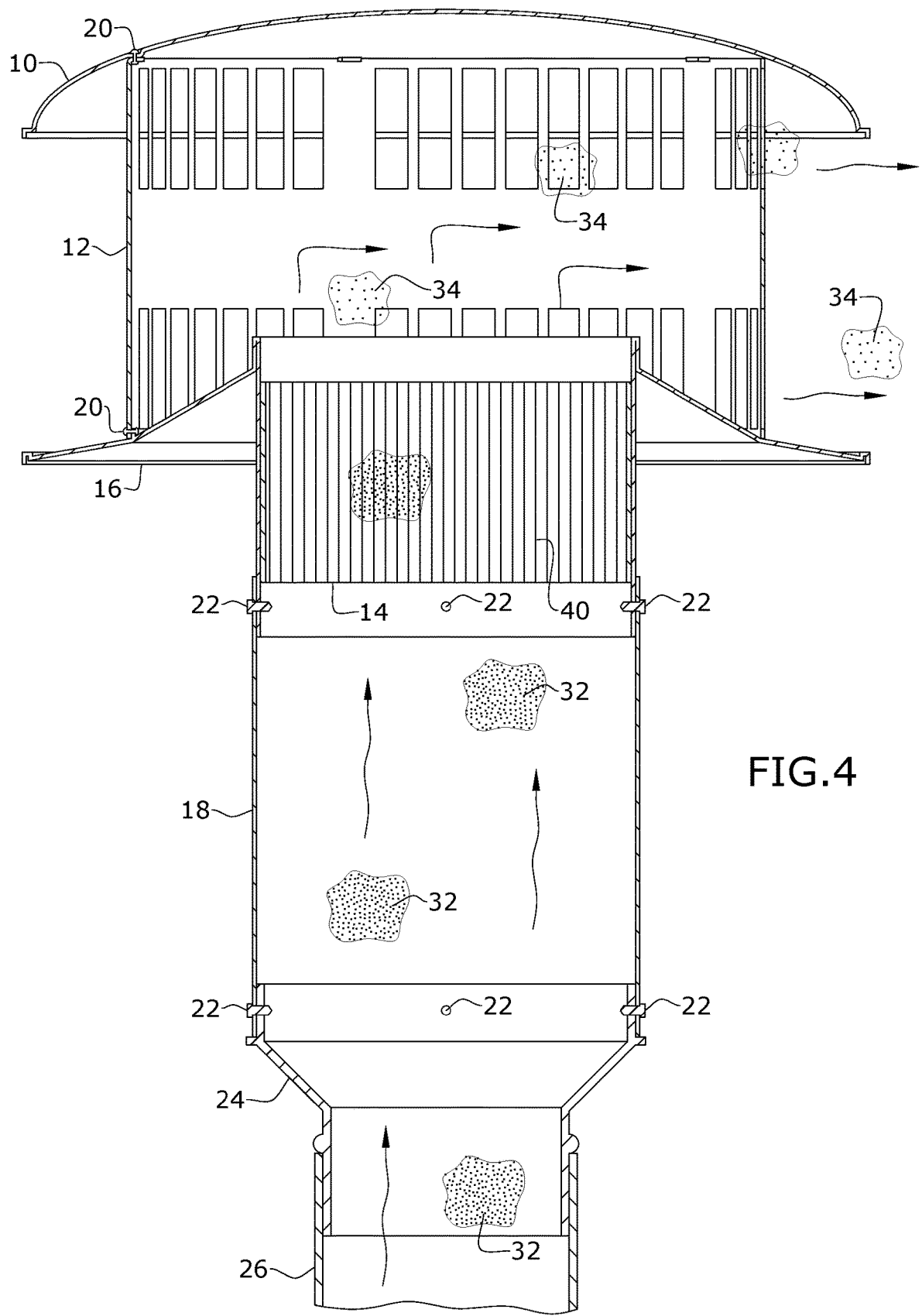
FIG. 4 is a partial section view of one embodiment of the present disclosure taken along line 4-4 in FIG. 1.

To use the device of the present disclosure, the flue cap may be installed on a current or new exhaust piping system comprising an exhaust pipe 26 extending from gas-fired appliances 28. As shown in FIG. 1, an exemplary system may include the exhaust pipe 26 extending through the framing 30 and the roof 36 of the building, wherein the flue cap device of the present disclosure is designed to engage with an end of the exhaust pipe 26 extending out of the building past the roof 36. The installation of the flue cap may be done via snapping, locking, twisting, and the like. As shown in FIG. 4, during use, the flue gas or NOx emissions 32 may travel from the appliance 28, through the exhaust pipe 26, and arrive at the flue pipe filtering device. The flue cap may capture the NOx gases as they pass through a vortex, thus reducing NOx gases before being expelled back out to the environment. In embodiments, the reduction may vary from about 20% to about 70%.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A flue pipe filter device for reducing nitrogen oxide (NOx) emission levels from gas fired appliances, the device comprising:
   a flue cap with a pipe connection adapter sized to attach to an existing exhaust pipe;
   a fanned flue cap body with vents operatively attached to a distal end of the pipe connection adapter;
   a filter positioned within the fanned flue cap body, the filter designed to convert NOx emissions into reduced NOx emissions; and
   a lower flue having a first end and a second end, wherein:
      the first end is operatively attached to the pipe connector adapter;
      the second end is attached to the fanned flue cap body;
      the fanned flue cap body comprises a lower cap with a central tubular member sized to attach to the lower flue; and
      the filter is positioned within the central tubular member, such that exhaust flowing through the lower flue into the fanned flue cap body passes through the filter.

2. The flue pipe filter device of claim 1, wherein:
   the fanned flue cap body further comprises:
      a vent body engaged with a top surface of the lower cap, the vent body comprising a plurality of vents extending therethrough; and
      a top cap attached to a top end of the vent body, thus causing the exhaust to exit the fanned flue cap body through the plurality of vents.

3. The flue pipe filter device of claim 2, wherein the plurality of vents are louvered vents.

4. The flue pipe filter device of claim 1, wherein the lower cap includes at least one condensate drip hole extending therethrough.

5. The flue pipe filter device of claim 1, wherein the filter comprises a cylindrical body with a honeycomb interior structure.

6. A flue pipe filter device for reducing nitrogen oxide (NOx) emission levels from gas fired appliances, the device comprising:
   a flue cap with a pipe connection adapter sized to attach to an existing exhaust pipe;
   a fanned flue cap body with vents operatively attached to a distal end of the pipe connection adapter;
   a filter positioned within the fanned flue cap body, the filter designed to convert NOx emissions into reduced NOx emissions; and
   a lower flue having a first end and a second end, wherein:
      the first end is operatively attached to the pipe connector adapter;
      the second end is attached to the fanned flue cap body; and
      the fanned flue cap body comprises a lower cap with at least one condensate drip hole extending therethrough.

* * * * *